United States Patent
Svetlik et al.

(10) Patent No.: US 6,769,338 B2
(45) Date of Patent: Aug. 3, 2004

(54) MULTIPLE POSITION SWITCH HANDLE WITH LOCKING MECHANISM

(75) Inventors: Kenneth N. Svetlik, Schaumburg, IL (US); Mark Kuras, Des Plaines, IL (US); Peter Domeny, Northbrook, IL (US); Abbas Javanshad, Skokie, IL (US)

(73) Assignee: Credo Technology Corporation, Wilmington, DE (US)

( * ) Notice: Subject to any disclaimer, the term of this patent is extended or adjusted under 35 U.S.C. 154(b) by 98 days.

(21) Appl. No.: 10/271,882

(22) Filed: Oct. 16, 2002

(65) Prior Publication Data

US 2004/0074361 A1 Apr. 22, 2004

(51) Int. Cl.[7] .............................................. B23D 19/00
(52) U.S. Cl. ........................ 83/471.3; 83/473; 83/490; 83/581; 30/519; 144/216; 16/110.1
(58) Field of Search ....................... 83/473, 490, 471.3, 83/581, 464, 463; 30/519; 144/216; 16/110.1, 408, 409, 410, 411

(56) References Cited

U.S. PATENT DOCUMENTS

| | | | |
|---|---|---|---|
| 4,428,266 A | 1/1984 | Keddie | |
| 4,785,540 A | 11/1988 | Arvidsson | |
| 5,483,727 A | * 1/1996 | Chang | 16/110.1 |
| 5,778,747 A | 7/1998 | Chen | |
| 5,842,400 A | 12/1998 | McIntosh | |
| 5,924,497 A | 7/1999 | Spooner et al. | |
| 5,969,312 A | 10/1999 | Svetlik et al. | |
| 6,108,867 A | 8/2000 | Nagashima | |
| 6,595,095 B2 | * 7/2003 | Chen | 83/473 |
| 6,658,976 B2 | * 12/2003 | Dils et al. | 83/471.3 |
| 2002/0100352 A1 | 8/2002 | Dils et al. | |
| 2003/0010171 A1 | * 1/2003 | Liu | 83/490 |

* cited by examiner

Primary Examiner—Allan N. Shoap
Assistant Examiner—Phong Nguyen
(74) Attorney, Agent, or Firm—Gardner Carton & Douglas LLP

(57) ABSTRACT

A bevel miter saw is provided having a switch handle that is ergonomically rotatable to a selected predetermined position as provided by a detent mechanism. An embodiment of the detent mechanism includes a detent member having radially directed slots, and a detent pin movable in a generally radial direction relative to the slots. Furthermore, a safety feature is provided wherein the detent pin is mounted to a lever including a projection that obstructs a trigger switch in the handle when the detent pin is not engaged in one of the detent slots so that the handle could rotate.

25 Claims, 11 Drawing Sheets

MULTIPLE POSITION SWITCH HANDLE WITH LOCKING MECHANISM

FIELD OF THE INVENTION

The invention generally relates to power tools and more particularly relates to a miter saw having an adjustable-position handle.

BACKGROUND OF THE INVENTION

Power miter saws are generally known. Typically, a power miter saw includes a base platform, a movable arm assembly mounted to the base platform, and a saw mounted to the arm assembly. Proximal to the user, the arm assembly includes a switch handle having a trigger switch for actuating a motor that drives a circular saw blade, and the handle is shaped to be gripped by a user for positioning the saw.

A conventional switch handle is disclosed, for example, in U.S. Pat. No. 5,969,312, incorporated herein by reference in its entirety. Some devices have included handles with an adjustable orientation. However, an improved handle for a miter saw is needed. In particular, it is desirable to provide a robust and reliable handle which is ergonomically adjustable. It is also desirable to provide a handle that is conveniently lockable into a selected rotational orientation.

BRIEF SUMMARY OF THE INVENTION

The invention provides a miter saw including a base and an arm movably mounted to the base. The arm supports a motorized saw unit and, more particularly, the arm is movable to set the saw unit at a desired bevel angle. At an end of the arm proximal to the operator, at a front of the saw, the arm includes a generally cylindrical hub having an interior cavity, a detent member mounted to the hub within the interior cavity, the detent member having a plurality of detent slots. Each of the detent slots is oriented in a generally radial direction relative to the generally cylindrical hub. The miter saw further includes a handle rotatably mounted to the arm, wherein the handle has a grip portion shaped to be gripped by a user; and a mounting portion extending from the grip portion, wherein the mounting portion is mounted for rotational movement relative to the hub. Additionally, a detent pin is movably mounted to the handle to engage a selected one of the detent slots to hold the handle in a corresponding angular position relative to the hub, the detent pin being retractable to permit adjustable rotation of the handle relative to the hub.

In an embodiment, the hub includes a detent member recess and wherein an outer portion of the detent member is received within the detent member recess.

In an embodiment, the detent member is generally C-shaped, and the detent member recess is cooperatively shaped.

In an embodiment, the hub includes a generally annular mounting recess, and the mounting portion of the handle includes an annular lip that fits within the mounting recess.

In an embodiment, a lever is movably mounted to the handle, and the detent pin is fixed to the handle so that movement of the handle causes the detent pin to move in a radial direction relative to the detent member. The lever is movable between a locked position wherein the detent pin engages one of the detent slots and an unlocked position wherein the detent pin is free from the detent member.

In an embodiment, a trigger movably is mounted to the handle for actuating a power switch, wherein the lever further has a projection that obstructs movement of the trigger to prevent actuation of the power switch when the lever is in the unlocked position and the projection is free from the trigger switch when the lever is in the locked position.

In an embodiment, the power tool further includes a locking collar that fits concentrically around contacting portions of the hub and the handle, the locking collar being tightenable to secure the hub and handle fixed relative to each other.

In an embodiment, the hub includes a first annular locking flange projecting exteriorly at an end of the hub, the first annular locking flange having a frustoconical, sloped side and a planar side, and wherein the mounting portion of the handle includes a second annular locking flange projecting exteriorly at an end of the mounting portion, the second annular locking flange having a frustoconical, sloped side and a planar side, wherein the respective planar sides of the first and second annular locking flanges contact each other so that the respective sloped sides are directed generally opposite to each other, and wherein the locking collar includes a tapered annular recess extending around an interior of the locking collar and receiving the first and second annular locking flanges, the tapered annular recess contacting the sloped sides to result in a force that presses the planar sides together.

In an embodiment, the hub includes at least two raised tabs located within an annular recess defined by the first annular locking flange, and the locking collar includes at least two recessed slots whereby the recessed slots engage the tabs in order to hold the collar in a fixed position relative to the hub.

In an embodiment, the invention also provides a miter saw including: a base; an arm movably mounted to the base, the arm supporting a motorized saw unit; a handle rotatably mounted to the arm, the handle including a trigger that is movable to actuate the motorized saw unit; and a lever operably linked to a detent mechanism, the lever being movable between a locked position wherein the detent mechanism locks the handle relative to the arm and an unlocked position wherein the detent mechanism permits the handle to rotate relative to the arm, the lever including a projection that that obstructs movement of the trigger to prevent actuation of the motorized saw unit when the lever is in the unlocked position and the projection is free from the trigger when the lever is in the locked position.

An advantage of the present invention is that it provides a miter saw having an improved handle.

Another advantage of the present invention is that it provides a miter saw having a handle that can be rotatably adjusted to a selected one of several predetermined ergonomic orientations. A related advantage is that the handle can be rotated to comfortably correspond to a bevel angle of the saw.

Yet another advantage of the present invention is that it provides a miter saw having a handle with a robust detent mechanism for reliably securing the handle in a selected predetermined rotational orientation.

A further advantage of the present invention is that it provides a miter saw has a handle which improves safety.

Yet another advantage of the present invention is that it provides a miter saw having a rotatably adjustable handle wherein actuation of the saw is prevented during adjustment of the handle.

DETAILED DESCRIPTION OF THE INVENTION

While the invention will be described in connection with the preferred embodiment, it will be understood that we do not intend to limit the scope of the invention to this embodiment. On the contrary, we intend to cover all alternatives, modifications and equivalents as may be included within the spirit and scope of the invention.

Figure 1:
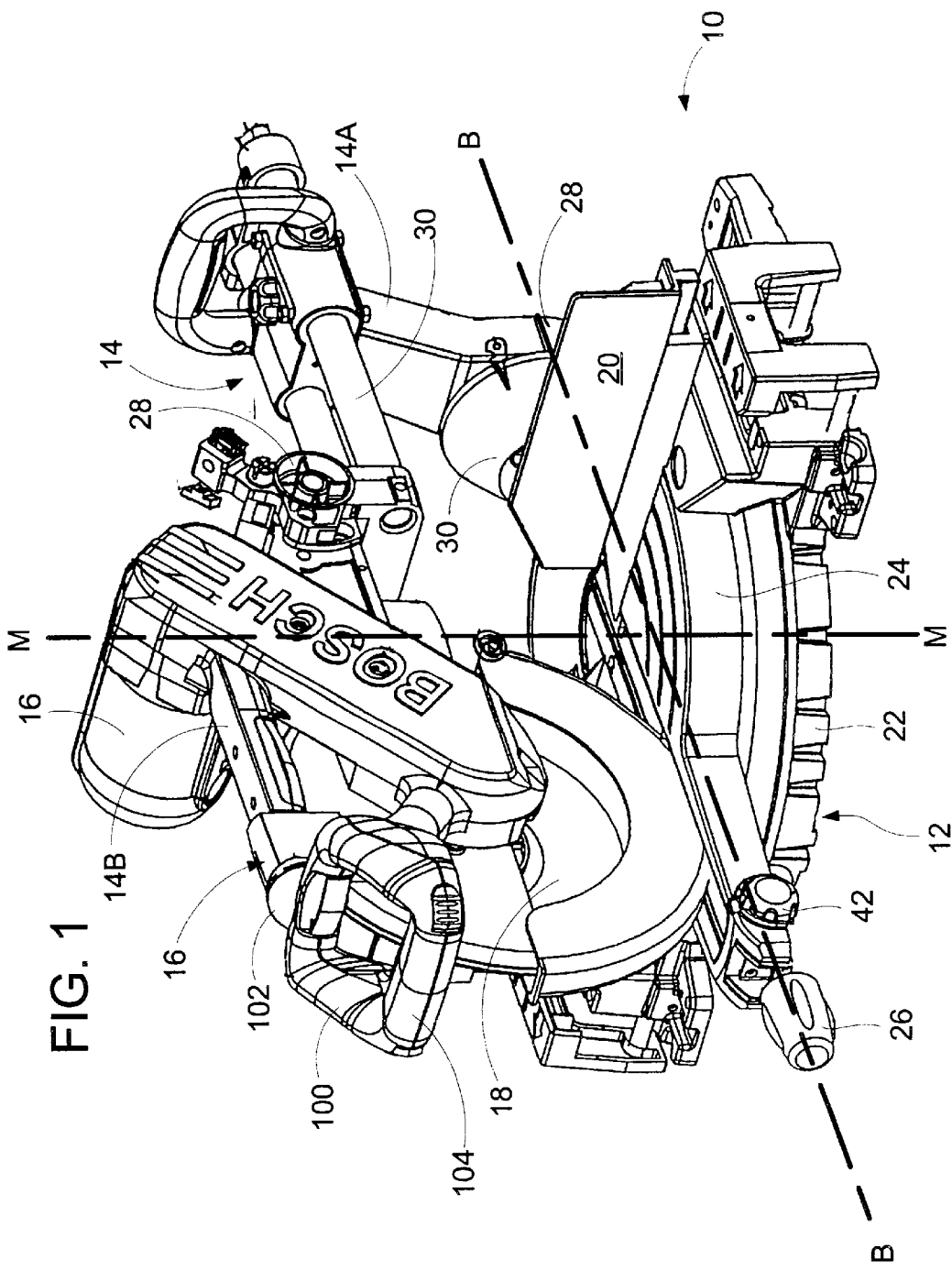
FIG. 1 is a perspective view of a miter saw having a handle constructed in accordance with the teachings of the invention.

Now referring to the drawings, wherein like numerals designate like components, FIG. 1, illustrates a miter saw 10 which generally includes a base 12, a movable support arm 14 pivotably mounted to the base, and a motorized saw unit 16. As illustrated, the motorized saw unit 16 is a power saw having a circular blade 18. The base 12 is configured to support a workpiece and, in an embodiment, the base includes a rip fence 20 to hold the workpiece steady. The miter saw is constructed so that the position of the blade 18 can be varied for cutting the workpiece.

For angular adjustment of the saw blade 18 on a "miter angle" about a vertical miter axis M, still referring to FIG. 1, the base 12 includes a stationary portion 22 that is supported on a stationary surface, such as a workbench (not shown) and, and a turntable 24 that is rotatably mounted to the stationary portion 22. The position of the turntable 24 corresponds to the miter angle of the saw blade 18 relative to the rip fence 20 on the base 12. A turntable handle 26 is provided for moving the turntable 24 to a selected miter angle.

The arm 14 facilitates movement of the saw blade 18 relative to the turntable 24. So that the tool unit 16 can be pivoted on a "bevel angle" about a horizontal bevel axis B, the support arm 14 includes a bevel arm or first arm portion 14A that is rotatably mounted to the turntable 24 to permit rotation about the bevel axis B. The arm 14 also includes a second arm portion 14B pivotally mounted to the first arm portion 14A at an elbow 28 so that the saw blade 18 can be moved generally downwardly toward the turntable. Optionally, the first arm portion 14A can include horizontally slidable rails 30 allow the tool unit to be moved in a sliding motion along a horizontal cutting line in the manner of a radial arm saw.

Figure 3A:
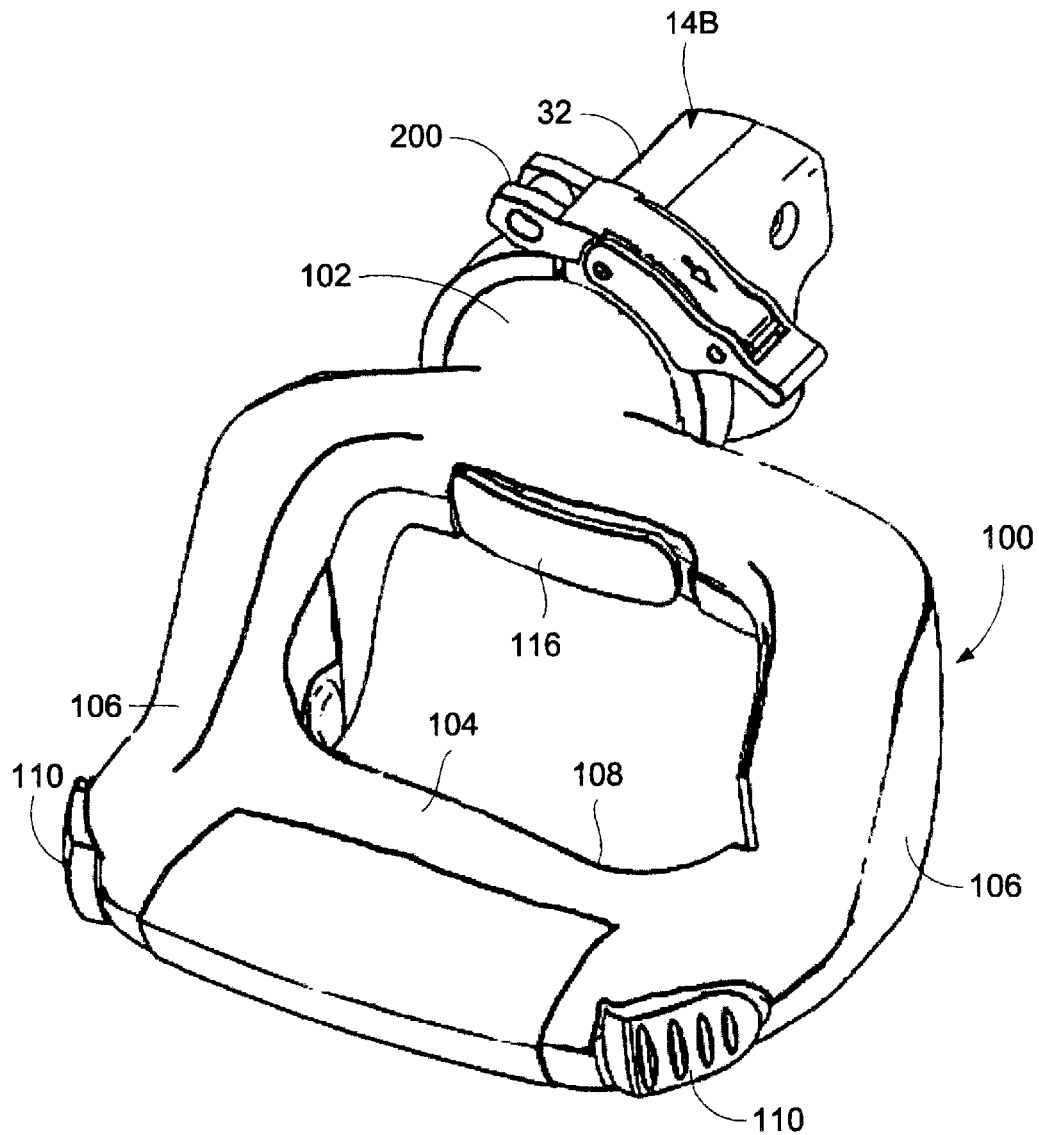
FIG. 3a is a perspective view of a handle of the saw of FIG. 1.

So that an operator can move the arm to desirably position and maneuver the saw blade 18, the arm 14 includes a switch handle 100. As illustrated in FIG. 1, the switch handle 100 is mounted to the second arm portion 14B generally at a front of the saw 10, proximal to the operator for convenient handling. The switch handle 100 has a shape which is comfortable for gripping. Referring to FIGS. 1 and 3a, the handle 100 is generally D-shaped, including a mounting portion 102 mounted to the arm and a grip portion 104 comfortable for gripping. The switch handle 100 includes a switch having a movable trigger 108 for actuating the motorized saw unit 16.

According to an aspect of the invention, the switch handle 100 is mounted in a manner that permits selected rotational adjustment to an ergonomically suitable position relative to the arm 14, providing comfortable handling of the saw at various bevel angles and in various modes of operation. Because the saw 10 can be operated in various possible bevel angles and with various cutting motions (e.g., horizontal sliding motion on the rails 30 of the first arm portion 14A or pivoting cutting motion by pivoting the second arm portion 14B at the elbow 28) it is desirable that a user can rotatably adjust the handle 100 to a comfortable gripping position, depending on the particular operation.

The miter saw preferably has a detent mechanism to hold the handle 100 in positions that are particularly suitable for use with commonly used bevel angle settings of −45° (counterclockwise), 0° (vertical), and 45° (clockwise). Because the handle 100 tilts with the first arm portion 14A as the bevel angle is adjusted, the predetermined handle positions provide a generally vertical or horizontal orientation of the grip portion 104, even when the arm is set at a bevel angle of 45° to the left or right. Such handle orientations have been found to be ergonomically desirable in various conditions.

Figure 2A:
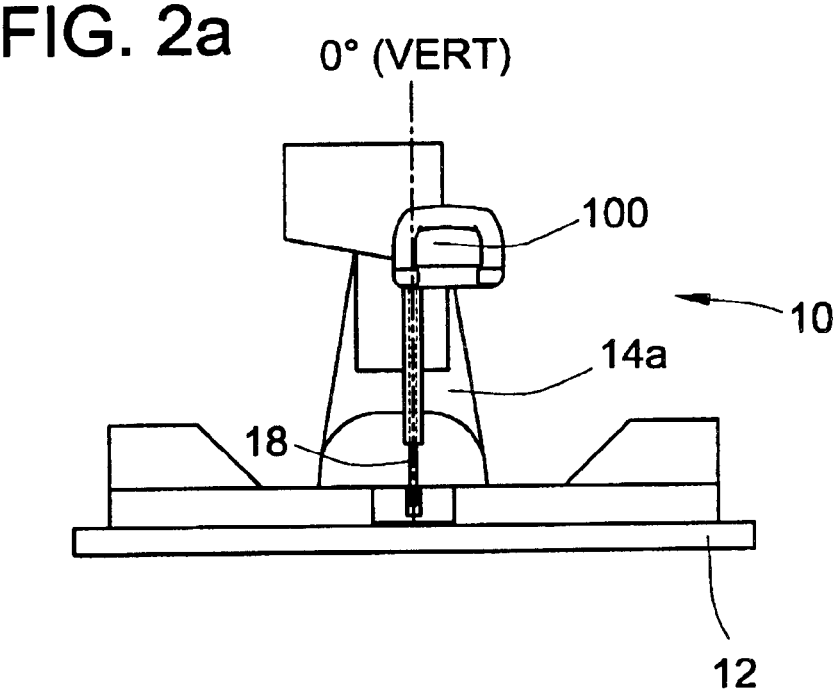
FIG. 2a is a schematic front elevation of the miter saw of FIG. 1, the saw blade set at a vertical orientation (0° bevel angle) and the handle in a horizontal position.
Figure 2B:
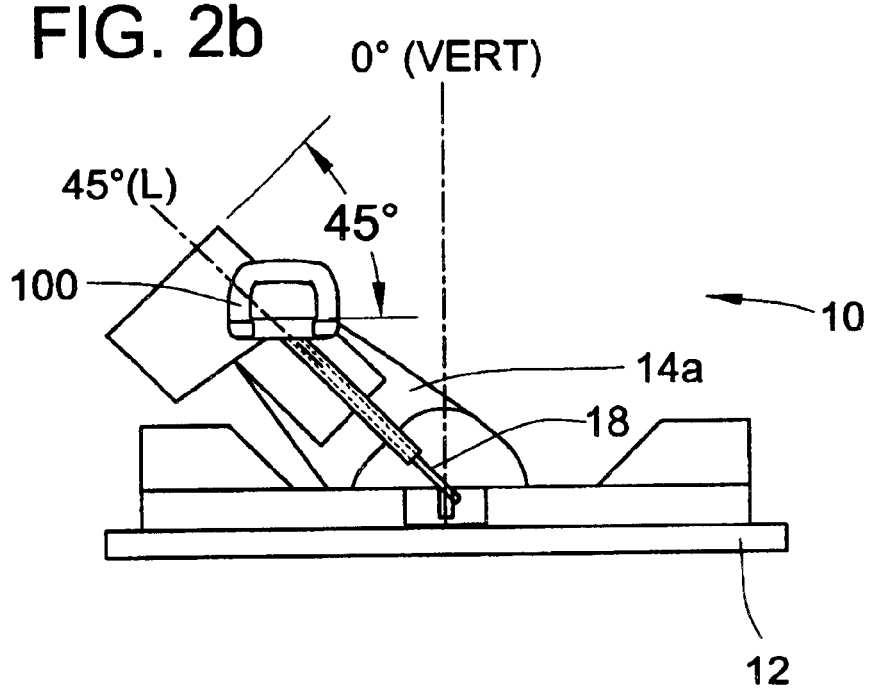
FIG. 2b is a schematic front elevation of the miter saw wherein the saw blade is set at a counterclockwise bevel angle of −45° and the handle is set at a +45° position for a horizontal handle orientation.
Figure 2C:
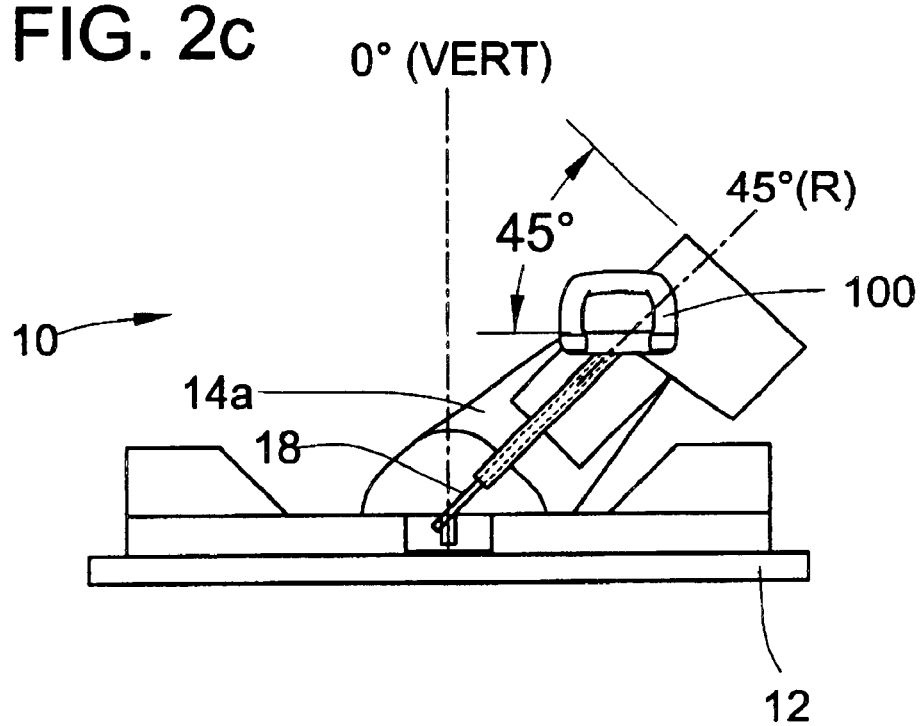
FIG. 2c is a schematic front elevation of the miter saw wherein the saw blade is set at a clockwise bevel angle of +45° and the handle is set at a −45° position for a horizontal handle orientation.
Figure 2D:
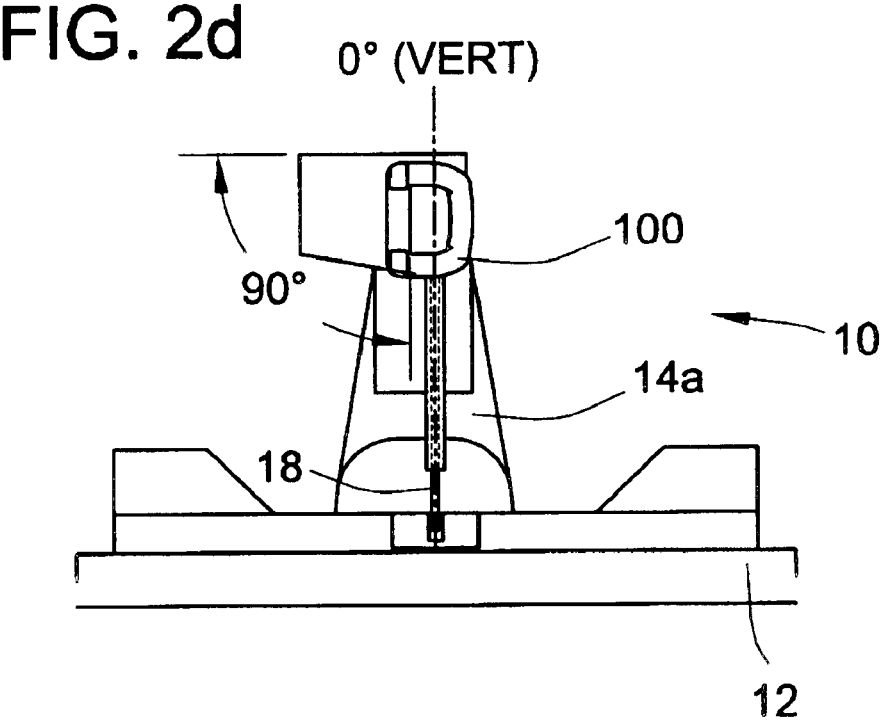
FIG. 2d is a schematic front elevation of the miter saw of FIG. 1, the saw blade set at a vertical orientation (0° bevel angle) and the handle is set at a +90° position for a vertical orientation.

For example, the handle 100 can be set at a selected one of four various rotational positions at 45° increments, as illustrated in FIGS. 2a–d which show the saw at various bevel angle positions of the arm 14. As shown in FIG. 2a, as measured when the arm 14 is set at a 0° bevel angle position for a vertical cut, the handle 100 is positioned so that the grip portion is oriented horizontally. As shown in FIG. 2b, the handle 100 can be rotated to a position of 45° clockwise to provide the handle with a horizontal orientation of the grip portion when the arm 14 is set at a counterclockwise bevel angle of −45°. When the arm 14 is set at a bevel angle of clockwise +45°, such as in a dual compound miter saw, the handle 100 may be adjusted to a position rotated counterclockwise −45° to still provide the grip portion with a horizontal orientation, as illustrated in FIG. 2c. FIG. 2d illustrates the handle 100 rotated +90° when the arm is back at a '0 bevel angle, providing the grip portion with a generally vertical orientation, which may be desired.

It has been found that a horizontal orientation of the grip portion (FIGS. 2a, 2b, 2c) is sometimes ergonomically desirable when using the saw to cut with a motion of pivoting the second arm portion 14B relative to the first arm portion 14A at the elbow 28 (FIG. 1) in a manner of a chop saw, even at various bevel angles. It has also been found that a vertical orientation of the grip portion (FIG. 2d) is sometimes ergonomically desirable when the saw is used as a radial arm saw with a front-rear cutting motion. Of course, the detents may be designed for any desired angle and handle positions other than those illustrated in FIGS. 2a–d.

Figure 3B:
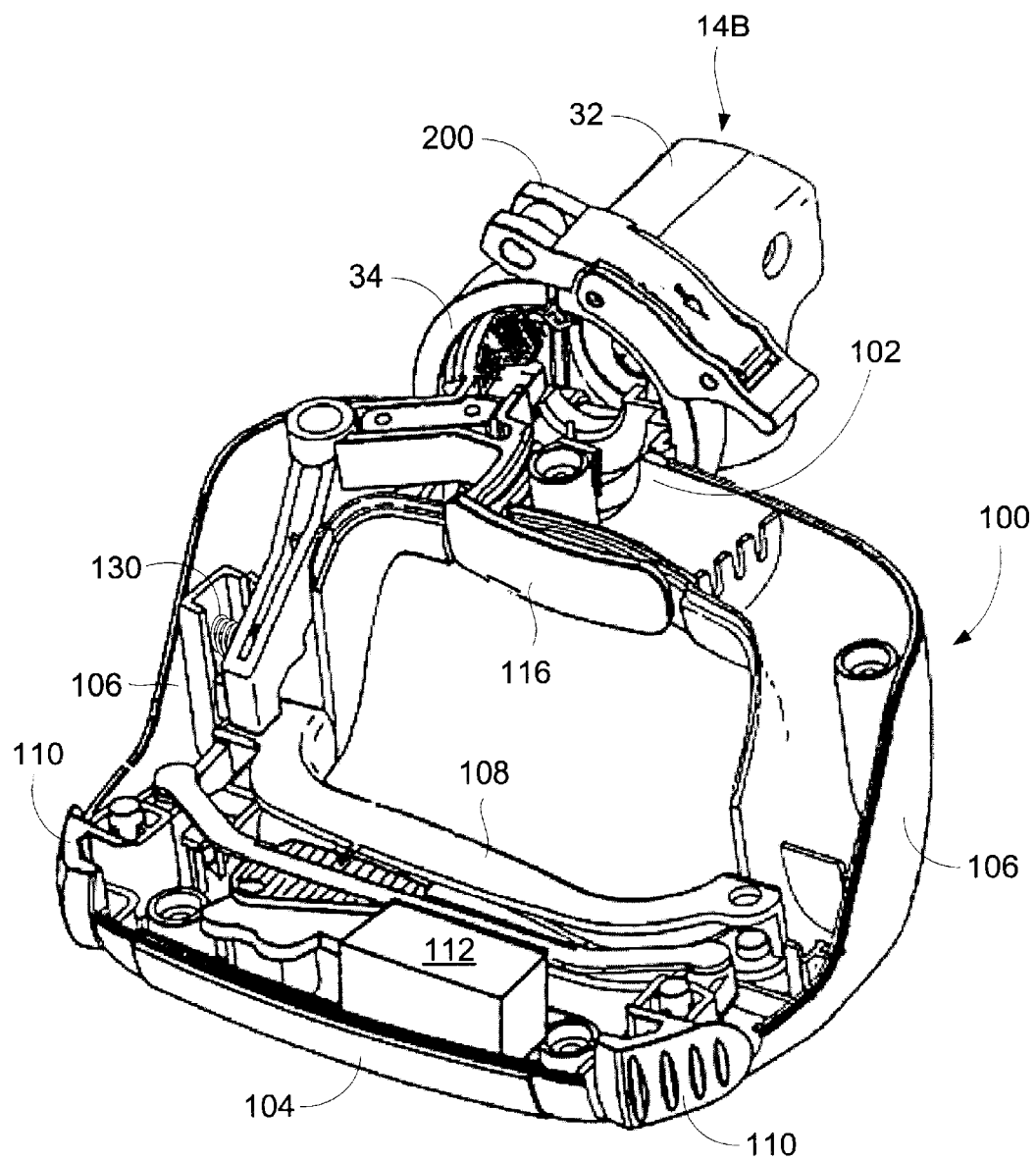
FIG. 3b is perspective view of the handle of FIG. 2A, a portion of the handle broken away to show interior components.
Figure 4:
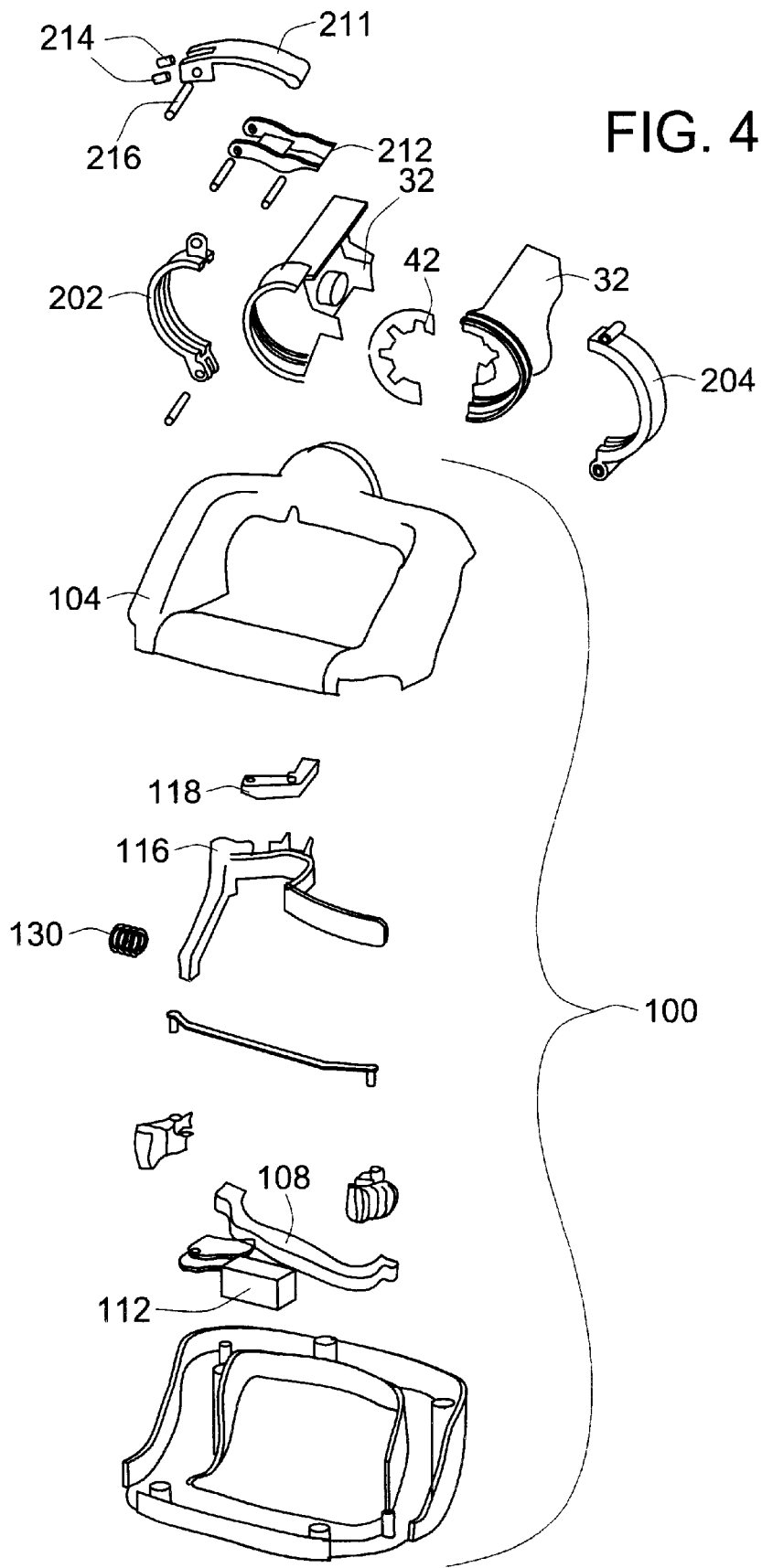
FIG. 4 is an exploded view of the handle, hub, and locking collar.

Turning to FIGS. 3a, 3b and 4, the switch handle 100 will be described in greater detail. The mounting portion 102 of the handle projects in a generally rearwardly direction and can be offset from a center of the handle 100. Side members 106 extend forwardly to the grip portion 104. The side members 106 can be angled so that the grip portion is downwardly offset from the mounting portion 102, as illustrated. For example, in an embodiment, the side members 106 are disposed at an angle of about 20°. The trigger 108 is generally elongate in shape and partially projects from an inner side of the grip portion 104. An electrical switch 112 (FIG. 3b) is contained in the grip portion 104 for actuation of the motorized saw unit 16 (FIG. 1) when the trigger 108 is squeezed. The handle 100 preferably also includes a pair of safety lockout buttons 110, at least one of which must be actuated before permitting the trigger 108 to be squeezed.

A proximal end of the arm 14 includes a hub 32 to which the handle 100 is mounted. As shown, the hub 32 is a two piece component that is generally cylindrically shaped, defining an interior cavity 34. Wiring to the trigger actuated switch 112 can pass through the cavity 34. Additionally, a locking collar 200 is provided to snugly fit concentrically around contacting portions of the hub 32 and handle 100.

Figure 6:
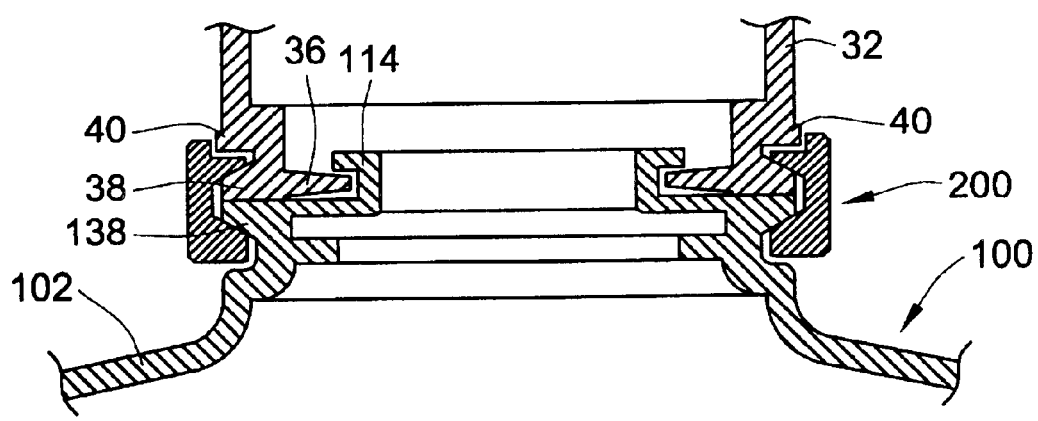
FIG. 6 is a schematic, fragmentary, sectional view of the handle, hub, and locking collar in a securely joined condition.

Referring to FIG. 6, it is shown that the mounting portion 102 includes an outwardly projecting lip 114 which fits within a recess in the hub 32, permitting relative rotation. An annular lip 36 that projects from the hub 32 defines the recess. Because the hub 32 is assembled from two bisected components, the lips can be positioned in an interdigitated manner.

To supplement the structure of the handle 100 and the hub 32, the locking collar 200 is cooperatively shaped with the hub 32 and mounting portion 102 to cause a tight and secure fit. Shown in FIGS. 6 and 7, the hub 32 includes a first annular locking flange 38 projecting exteriorly at an end of the hub 32, and the mounting portion 102 of the handle 100 includes a second annular locking flange 138 which projects exteriorly from the handle 100. Each of the flanges 38, 138 has a sloped side and a planar side. The respective planar sides are positioned to contact flush against each other as illustrated so that the sloped sides face in generally opposite directions. An interior of the locking collar 200 includes a tapered annular recess to receive the locking flanges. The tapered annular recess contacts the sloped sides to press the planar sides together. The resulting tight friction yields a robust mount of the handle 100 to the hub 32.

Figure 8A:
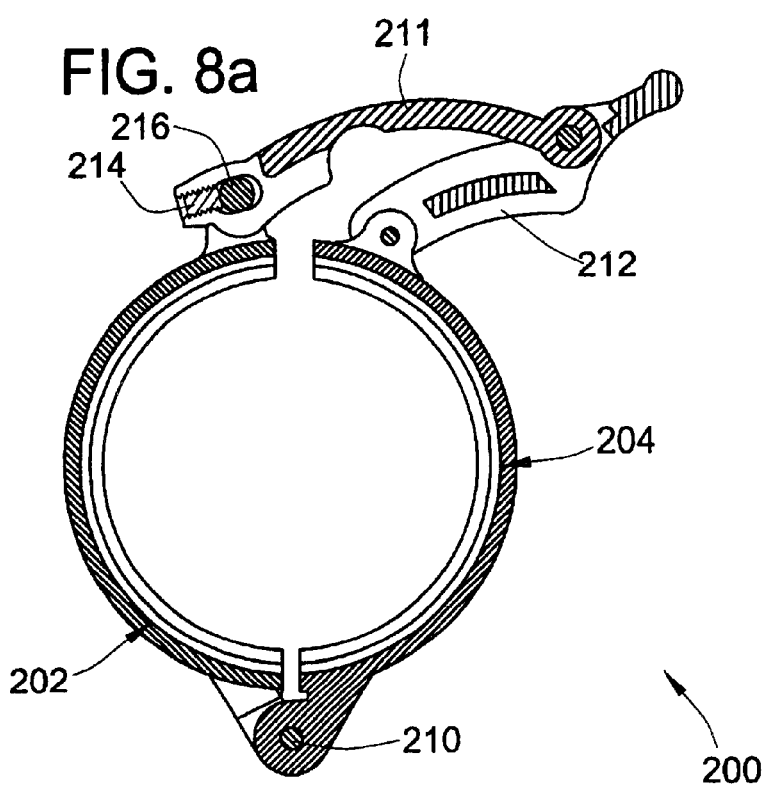
FIG. 8a is a sectional view the locking collar in an open position.
Figure 8B:
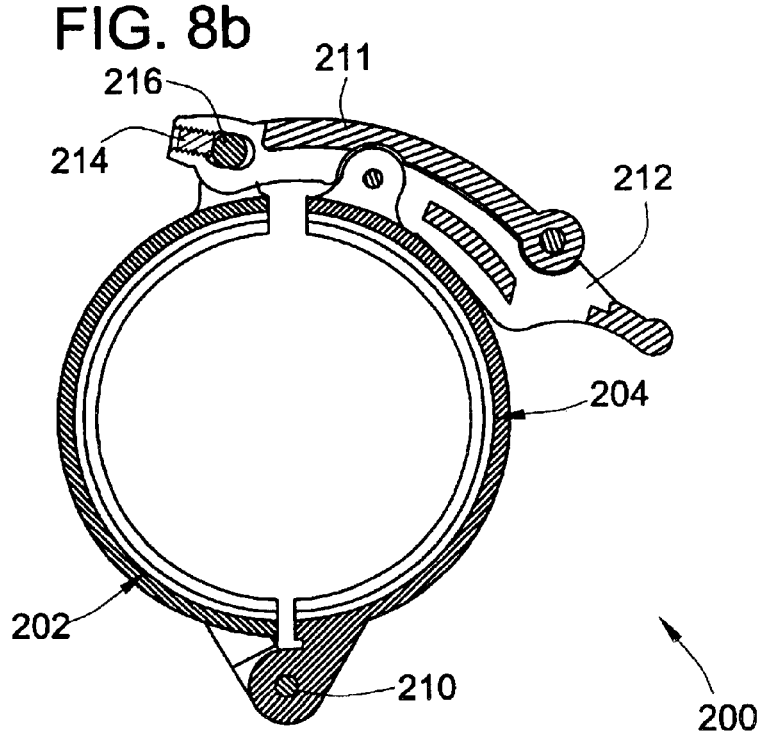
FIG. 8b is a sectional view of the locking collar of FIG. 9A in closed position.

To permit selected rotational adjustments of the handle 100, the locking collar 200 can be selectively be released or tightened from the locking flanges, as illustrated in FIGS. 8a and 8b, respectively. With reference to FIG. 8a, the locking collar 200 includes a left and right generally semicircular portions 202, 204 respectively. The semicircular portions 202, 204 have respective first ends that are mounted to each other at a hinge 210. The semicircular portions 202, 204 have respective second ends hingably mounted to a clamp that includes first and second levers, 211, 212. The first lever 211 has a base end hingably connected to the left semicircular portion 202 and the second lever 212 having a base end hingably connected to the right semicircular portion, 204. In order to force the second ends of the left and right semicircular portions together to a closed position as shown in FIG. 8b, the first lever 211 has a distal end hingably mounted to an intermediate position of the second lever 212.

As shown in FIGS. 8a and 8b, the first lever 211 is pivotably mounted to the semicircular portion by a pin 214. So that the tightness of the collar 200 can be adjusted, the first lever 211 includes a pair of threaded adjustment screws 214 which contact against the pin 216. By varying the axial positions of the threaded adjustment screws 214, the geometry of the linkage formed by the first and second levers 211 and 212 is varied, affecting the tightness of the semicircular portions 202, 204 in the closed position of FIG. 8b.

FIG. 8a illustrates the locking collar 200 in an open position in which the collar is loose with respect to the hub 32 and handle 100 a second position in which the collar is constricted around the contacting portions of the hub 32 and handle 100.

Figure 7:
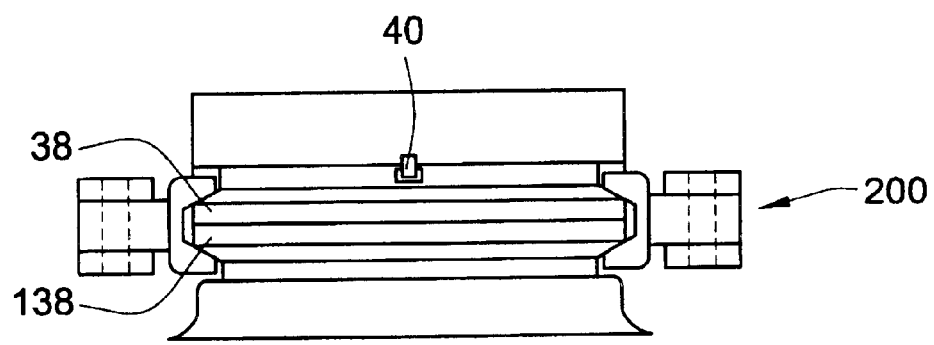
FIG. 7 is a schematic plan view of the handle and hub assembly of FIG. 6, the locking collar being illustrated in section.

In an embodiment, the locking collar 200 interfits with the hub 32 to prevent relative rotation of the locking collar 200. For example, as illustrated in FIGS. 6 and 7, the hub 32 has a pair of tabs 40, and the locking collar 200 has a pair of complementary recesses which receive the tabs 40 to prevent relative rotation.

Figure 5:
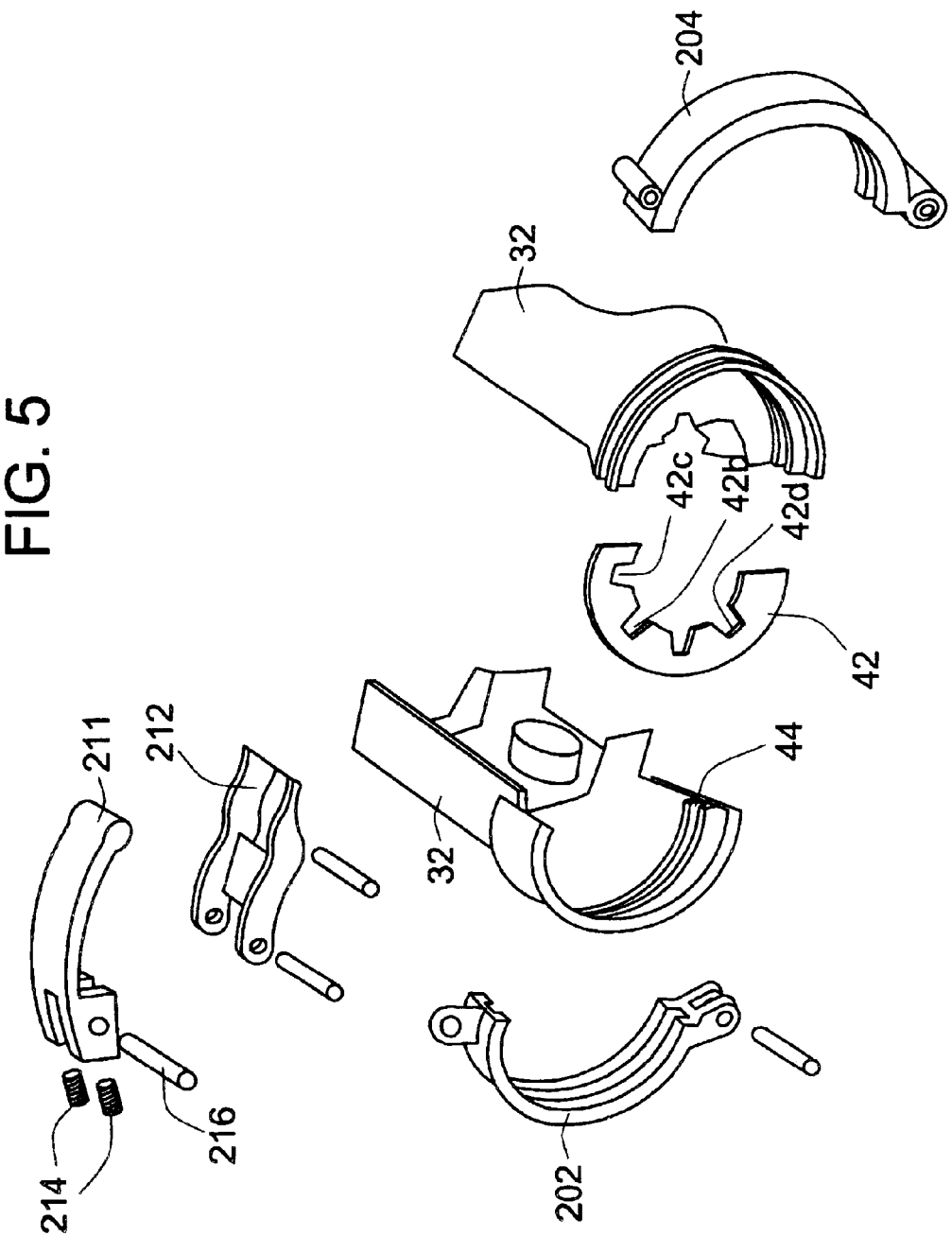
FIG. 5 is an exploded, perspective view the hub and locking collar.

According to an aspect of the invention, the handle 100 is movable to predetermined rotational positions relative to the arm, as discussed above with reference to the exemplary handle positions shown in FIGS. 2A–D. In an embodiment, a detent mechanism is provided to provide selected rotational stops at the predetermined positions. More particularly, referring to FIGS. 4 and 5, a detent member 42 is mounted to the hub 32 within the interior cavity 34. The detent member 42 is generally C-shaped and has a plurality of detent slots 42A, 42B, 42C, and 42D (FIG. 5), which are oriented in a generally radial direction relative to the hub 32. In an embodiment, the detent member 42 securely resides within a detent member recess 44 (FIG. 5) formed in interior of the hub 32.

Figure 9A:
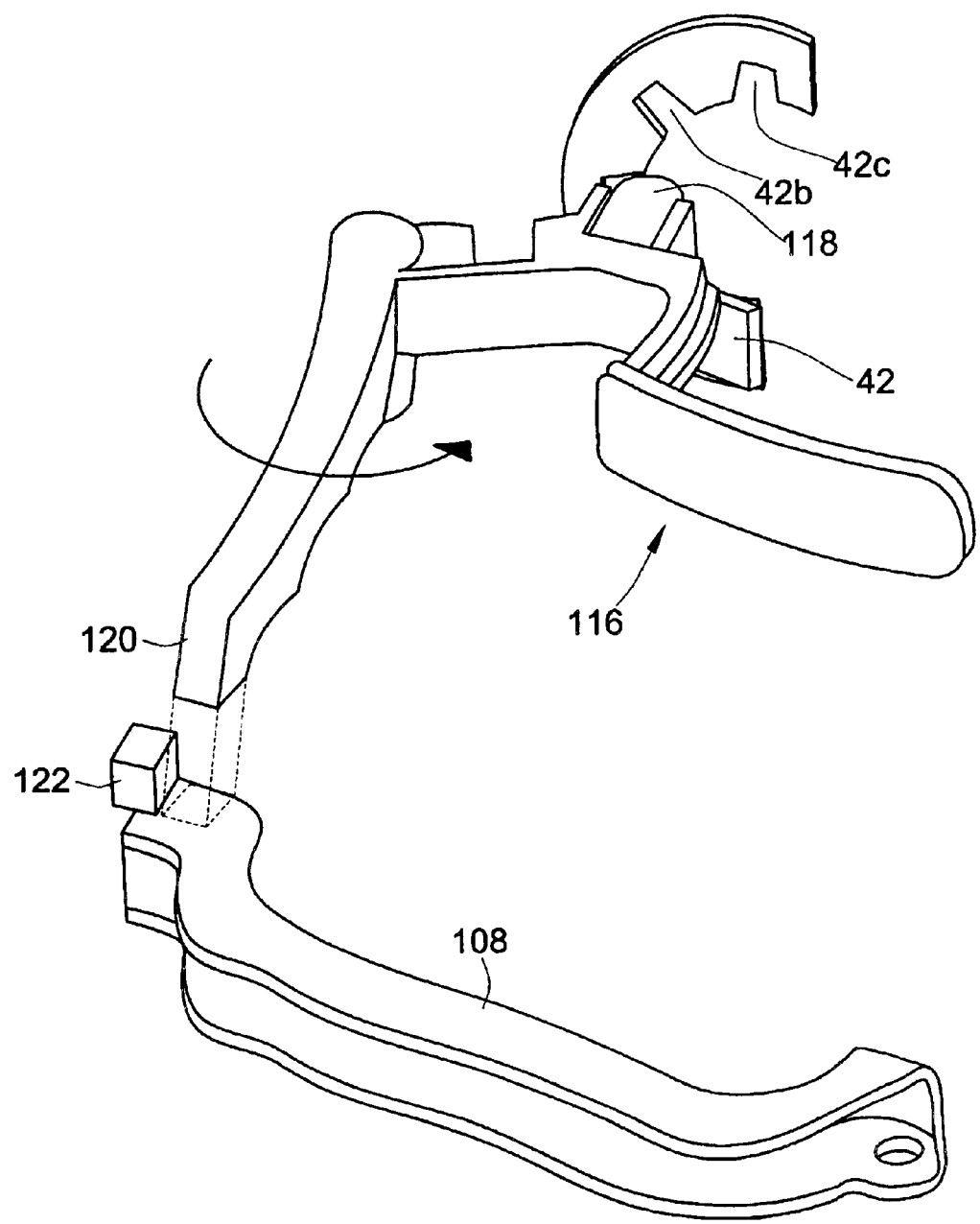
FIG. 9a is a schematic view of the lever in a locked position.
Figure 9B:
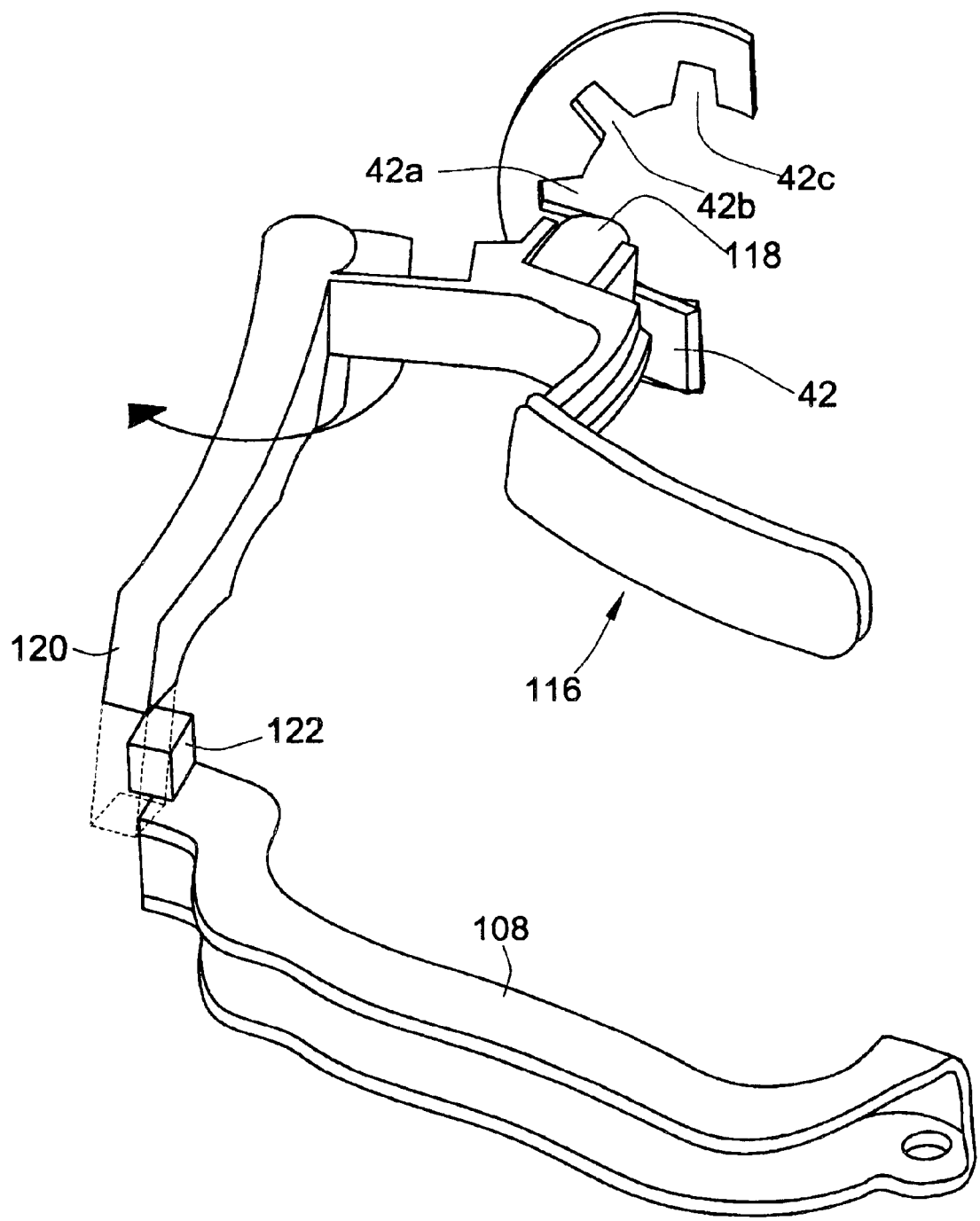
FIG. 9b is a schematic view of the lever in an unlocked position and obstructing the trigger from moving to an actuated position.

Also, as illustrated in FIGS. 3a, 3b, 4, 9a and 9b, a lever 116 is pivotally mounted to the handle 100 for actuation by the operator. The lever 116 includes a detent pin 118 which is positioned to extend and retract from the slots 42A–D (FIG. 5) of the detent member 42, preferably with a generally radial motion. The lever 116 is movable between a locked position (FIG. 9a) wherein the detent pin 118 engages one of the detent slots and an unlocked position (FIG. 9b) wherein the detent pin 118 is free from the detent member 42. In the locked position (FIG. 9a), the handle 100 is fixed and cannot rotate relative to the hub 32. In the unlocked position (FIG. 9b), the handle 100 can be rotated relative to the hub 32 to a different selected position. A biasing member or spring 130 (FIGS. 3b and 4) is mounted within the handle 100 for biased contact against the lever 116 to urge the detent pin toward the locked position (FIG. 9a). So that the detent pin 118 can easily find the respective slots 42A–D, the sides of each of the detent slots taper apart toward a center of the detent member.

When the detent pin 118 engages selected one of the detent slots 42A–D, the handle 100 is fixed in a corresponding angular position relative to the hub 32. In the example illustrated in FIGS. 4, 9a and 9b: when the detent pin is engaged in slot 42A, the handle 100 is at a horizontal position (with respect to a vertical saw orientation), as illustrated in FIG. 2a; when the detent pin 118 is engaged in slot 42B, the handle 100 is at a position 45° clockwise, as illustrated in FIG. 2b; when the detent pin is engaged in slot 42C, the handle 100 is at a position 45° counterclockwise, as illustrated in FIG. 2a; and when the detent pin is engaged in slot 42D, the handle 100 is at a position 90° clockwise, as illustrated in FIG. 2D.

To enhance safety, in an embodiment, the trigger 108 is prevented from actuating the motorized saw unit 16 when the handle 100 is not locked in position. For example, referring to FIGS. 9a and 9b, the lever 116 also includes a projection 120 that obstructs movement of the trigger 108 to prevent actuation of the power switch when the lever is in the unlocked position (FIG. 9b) and the projection is free from the trigger 108 when the lever is in the locked position (FIG. 9a). In particular, the trigger 108 includes a tooth 122 that projects upwardly, and when the lever 116 is pivoted to the unlocked position, the projection 120 shifts behind the tooth 122, blocking motion of the trigger in the squeezing direction. Likewise, when the trigger 108 is squeezed, the projection blocks the lever 116 from being subsequently moved to the unlocked position.

In an embodiment, the pivotal detent pin 118 is configured so for movement among the detent slots 42A–D by rotating the handle with a torsional force. Such an embodiment avoids a need for manual actuation of the lever 116, and accordingly, the invention includes an embodiment wherein the lever has no exteriorly accessible portion for gripping by the user. More specifically, the slots 42A–D and/or the detent pin are shaped with appropriate angles or curves so that rotational input causes the detent pin to move radially to disengage from the slot 42A–D. In order to adjust the handle 100 to a different detent position, the torsional input must be sufficient to overcome the radially outward spring bias force against the detent pin. In such an embodiment, the locking collar 200 is released to its open position (FIG. 8a) before a rotational adjustment of the handle is to be made, and the collar 200 is then clamped to its closed position (FIG. 8b) after the desired rotational adjustment has been made.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A miter saw comprising:

a base;

an arm movably mounted to the base, the arm supporting a motorized saw unit;

a handle rotatably mounted to the arm, the handle including a trigger that is movable to actuate the motorized saw unit;

a lever operably linked to a detent mechanism, the lever being movable between a locked position wherein the detent mechanism locks the handle relative to the arm and an unlocked position wherein the detent mechanism permits the handle to rotate relative to the arm, the lever including a projection that obstructs movement of the trigger to prevent actuation of the motorized saw unit when the lever is in the unlocked position and the projection is free from the trigger when the lever is in the locked position.

2. The miter saw of claim 1, wherein the detent mechanism includes:

a detent member mounted to the arm, the detent member having a plurality of detent slots, each of the detent slots being oriented in a generally radial direction relative to the hub; and a detent pin movably mounted to the handle to engage a selected one of the detent slots to hold the handle in a corresponding angular position relative to the hub, the detent pin being movable in a generally radial direction relative to the slots between a locked position to prevent rotation of the handle and an unlocked position to permit adjustable rotation of the handle relative to the arm.

3. The miter saw of claim 1, further comprising:

a locking collar concentrically mounted around complementary flanges of the arm and handle in contact with each other.

4. The miter saw of claim 3, wherein the flanges and the locking collar are cooperatively shaped to press the flanges together in an axial direction.

5. A miter saw comprising:

a base;

an arm movably mounted to the base, the arm including a hub having a generally cylindrical interior cavity, a detent member mounted to the hub within the interior cavity, the detent member having a plurality of detent slots, each of the detent slots being oriented in a generally radial direction relative to the hub;

a handle rotatably mounted to the hub, the handle including:

a grip portion shaped to be gripped by a user; and a mounting portion extending from the grip portion, wherein the mounting portion is mounted for rotational movement relative to the hub; and a detent pin movably mounted to the handle for generally radial movement relative to the slots, the detent pin being movable between a locked position to engage a selected one of the detent slots to hold the handle in a corresponding angular position relative to the hub and an unlocked position in which the detent pin is free from the detent member to permit adjustable rotation of the handle relative to the hub.

6. The miter saw of claim 5, wherein the hub includes a detent member recess and wherein an outer portion of the detent member is received within the detent member recess.

7. The miter saw of claim 5, wherein the detent member is generally C-shaped, and wherein the detent member recess is cooperatively shaped to receive the detent member.

8. The miter saw of claim 5, wherein the hub includes a generally annular mounting recess, and wherein the mounting portion of the handle includes an annular lip that fits within the mounting recess.

9. The miter saw of claim 5, further comprising a lever movably mounted to the handle, the detent pin being fixed to the lever so that movement of the lever causes the detent pin to move radially relative to the detent member.

10. The miter saw of claim 9, wherein the lever is movable between a locked position wherein the detent pin engages one of the detent slots and an unlocked position wherein the detent pin is free from the detent member.

11. The miter saw of claim 10, further including a trigger movably mounted to the handle for actuating a power switch, wherein the lever further has a projection that obstructs movement of the trigger to prevent actuation of the power switch when the lever is in the unlocked position and the projection is free from the trigger switch when the lever is in the locked position.

12. The miter saw of claim 5, further comprising a locking collar that fits concentrically around contacting portions of the hub and the handle, the locking collar being tightenable to secure the hub and handle fixed relative to each other.

13. The miter saw of claim 12, wherein the locking collar comprises a generally semicircular left portion and a generally semicircular right portion, each of the semicircular portions having a respective first and second end; wherein the first ends of the left and right portions are hingably mounted to each other, the collar further comprising a clamp operable to move the second ends of the respective left and right portions between an open position in which the collar is loose with respect to the hub and handle a closed position in which the collar is constricted around the contacting portions of the hub and handle.

14. The miter saw of claim 13, wherein the clamp includes a pair of levers, a first lever having a base end hingably connected to the left semicircular portion, a second lever having a base end hingably connected to the right semicircular portion, wherein the first lever has a distal end opposite the base end, wherein the distal end is hingably mounted to the second lever at an intermediate position along a length of the second lever.

15. The miter saw of claim 12, wherein the hub includes a first annular locking flange projecting exteriorly at an end of the hub, the first annular locking flange having a sloped side and a planar side, and wherein the mounting portion of the handle includes a second annular locking flange projecting exteriorly at an end of the mounting portion, the second annular locking flange having a sloped side and a planar side, wherein the respective planar sides of the first and second annular locking flanges contact each other so that the respective sloped sides are directed generally opposite to each other, and wherein the locking collar includes a tapered annular recess extending around an interior of the locking collar and receiving the first and second annular locking flanges, the tapered annular recess contacting the sloped sides to result in a force that presses the planar sides together.

16. The miter saw of claim 15, wherein locking collar interfits with the hub to prevent relative rotation of the locking collar.

17. The miter saw of claim 5, wherein the handle is generally D-shaped.

18. A miter saw comprising:

a base;

an arm movably mounted to the base, the arm including a hub having a generally cylindrical interior cavity, a detent member mounted to the hub within the interior cavity, the detent member having a plurality of detent slots, each of the detent slots being oriented in a generally radial direction relative to the hub;

a handle rotatably mounted to the hub, the handle including:

a grip portion shaped to be gripped by a user;

a mounting portion extending from the grip portion, wherein the mounting portion is mounted for rotational movement relative to the hub; and a detent pin movably mounted to the handle for movement between a locked position to engage a selected one of the detent slots and unlocked position in which the detent pin is free from the detent slots;

a biasing member operable to bias the detent pin toward the locked position; and a locking collar that fits concentrically around contacting portions of the hub and the handle, the locking collar being tightenable to secure the hub and handle fixed relative to each other.

19. The miter saw according to claim 18, wherein the detent pin is movably mounted to the handle for generally radial movement relative to the slots.

20. The miter saw of claim 18, further comprising a lever movably mounted to the handle, the detent pin being fixed to the lever so that movement of the lever causes the detent pin to move radially relative to the detent member.

21. The miter saw of claim 20, wherein the lever is movable between a locked position wherein the detent pin engages one of the detent slots and an unlocked position wherein the detent pin is free from the detent member.

22. The miter saw of claim 21, further including a trigger movably mounted to the handle for actuating a power switch, wherein the lever further has a projection that obstructs movement of the trigger to prevent actuation of the power switch when the lever is in the unlocked position and the projection is free from the trigger switch when the lever is in the locked position.

23. The miter saw of claim 18, wherein the locking collar comprises a generally semicircular left portion and a generally semicircular right portion, each of the semicircular portions having a respective first and second end; wherein the first ends of the left and right portions are hingably mounted to each other, the collar further comprising a clamp operable to move the second ends of the respective left and right portions between an open position in which the collar is loose with respect to the hub and handle a closed position in which the collar is constricted around the contacting portions of the hub and handle.

24. The miter saw of claim 23, wherein the clamp includes a pair of levers, a first lever having a base end hingably connected to the left semicircular portion, a second lever having a base end hingably connected to the right semicircular portion, wherein the first lever has a distal end opposite the base end, wherein the distal end is hingably mounted to the second lever at an intermediate position along a length of the second lever.

25. The miter saw of claim 1, wherein the hub includes a first annular locking flange projecting exteriorly at an end of the hub, the first annular locking flange having a sloped side and a planar side, and wherein the mounting portion of the handle includes a second annular locking flange projecting exteriorly at an end of the mounting portion, the second annular locking flange having a sloped side and a planar side, wherein the respective planar sides of the first and second annular locking flanges contact each other so that the respective sloped sides are directed generally opposite to each other, and wherein the locking collar includes a tapered annular recess extending around an interior of the locking collar and receiving the first and second annular locking flanges, the tapered annular recess contacting the sloped sides to result in a force that presses the planar sides together.

\* \* \* \* \*

UNITED STATES PATENT AND TRADEMARK OFFICE
CERTIFICATE OF CORRECTION

PATENT NO. : 6,769,338 B2  Page 1 of 1
DATED : August 3, 2004
INVENTOR(S) : Svetlik et al.

It is certified that error appears in the above-identified patent and that said Letters Patent is hereby corrected as shown below:

Column 11,
Line 7, "The miter saw of claim 1" should read -- The miter saw of claim 18 --.

Signed and Sealed this

Twenty-sixth Day of October, 2004

JON W. DUDAS
*Director of the United States Patent and Trademark Office*